United States Patent
Carstensen et al.

[19]

[11] Patent Number: 5,943,993
[45] Date of Patent: Aug. 31, 1999

[54] FOUR-STROKE INTERNAL COMBUSTION ENGINE WITH SPARK IGNITION

[75] Inventors: Hartmut Carstensen, Graz; Christian Beidl, Eggersdorf; Frank Mundorff, Graz, all of Austria

[73] Assignee: AVL List GmbH, Graz, Austria

[21] Appl. No.: 09/020,428

[22] Filed: Feb. 9, 1998

[30] Foreign Application Priority Data

Feb. 10, 1997 [AT] Austria ..................................... 80/97 U

[51] Int. Cl.$^6$ ............................. F02B 23/10; F02B 31/00
[52] U.S. Cl. ........................... 123/298; 123/301; 123/302
[58] Field of Search ................... 123/295, 298, 123/301, 302, 305, 308, 657, 661

[56] References Cited

U.S. PATENT DOCUMENTS

| | | | |
|---|---|---|---|
| 3,766,900 | 10/1973 | Aiti ......................................... | 123/657 |
| 4,751,902 | 6/1988 | August .................................... | 123/263 |
| 4,763,622 | 8/1988 | Indra et al. ............................. | 123/308 |
| 5,727,520 | 3/1998 | Wirth et al. .......................... | 123/302 X |

FOREIGN PATENT DOCUMENTS

| | | |
|---|---|---|
| 0558072 | 9/1993 | European Pat. Off. . |
| 0694682 | 1/1996 | European Pat. Off. . |
| 1184314 | 7/1959 | France . |
| 60-187714 | 9/1985 | Japan . |

OTHER PUBLICATIONS

SAE Paper No. 941088 by Lawrence Evers entitled, "Characterization of the Transient Spray from a High Pressure Swirl Injector".

*Primary Examiner*—Tony M. Argenbright
*Attorney, Agent, or Firm*—Watson Cole Grindle Watson, P.L.L.C.

[57] ABSTRACT

The invention relates to a four-stroke internal combustion engine with spark ignition and direct injection of the fuel into the combustion chamber, with a reciprocating piston for each cylinder and a roof-shaped top of the combustion chamber with at least one exhaust valve and at least two intake valves, as well as intake ports generating a tumble flow in the combustion chamber, as well as a fuel injection device opening into the combustion chamber, and an ignition source located in the area of the cylinder axis in the roof of the combustion chamber. In order to obtain good internal flow conditions the surface of the piston facing the combustion chamber is provided with a substantially Y-shaped configuration of flow guiding ribs, of which an arc-shaped rib is positioned approximately in the center of the piston and encloses a trough-shaped recess, and a longitudinal rib is provided on the side of the arc-shaped rib opposite of the recess, and the ignition source is positioned above the recess, and the fuel injection device is positioned in the area of the cylinder wall between the intake valves.

20 Claims, 3 Drawing Sheets

FOUR-STROKE INTERNAL COMBUSTION ENGINE WITH SPARK IGNITION

BACKGROUND OF THE INVENTION

This invention relates to a four-stroke internal combustion engine with spark ignition and direct injection of the fuel into the combustion chamber, with a reciprocating piston for each cylinder and a roof-shaped top of the combustion chamber with at least one exhaust valve and at least two intake valves, as well as intake ports generating a tumble flow in the combustion chamber, as well as a fuel injection device opening into the combustion chamber and an ignition source located in the area of the cylinder axis in the roof of the combustion chamber.

DESCRIPTION OF THE PRIOR ART

Ever stricter demands concerning the reduction of fuel consumption and exhaust emissions, in particular hydrocarbon and nitrogen oxide emissions, necessitate the use of new technologies in internal combustion engines, above all in engines of the spark-ignition type, which are predominant in the automobile industry.

One of the main reasons why the specific fuel consumption of a spark-ignition engine is higher than that of a diesel engine, is that the spark-ignition engine runs on a premixed, homogeneous fuel-air mixture. This requires control of the engine load by means of a throttling element limiting the total intake of fuel air mixture (regulation by quantity).

Throttling the intake flow leads to a thermodynamic loss, which will increase fuel consumption of the engine. If such throttling is avoided, potential fuel savings amount to an estimated 25 percent.

Full use of the fuel saving potential is made possible by direct fuel injection and largely unthrottled engine operation, such that a spark-ignition engine may be operated in a manner similar to a diesel engine, using regulation by quality, i.e., control of the engine load by variation of the fuel-air ratio.

This mode of operation demands specific measures to safeguard complete and stable combustion even with a very high proportion of air in the mixture (low engine load), i.e., when a homogeneous fuel-air mixture is no longer ignitible.

This problem is commonly solved by providing for a strongly stratified, i.e., inhomogeneous, distribution of the mixture, which may be advantageously attained in the instance of direct fuel injection by injecting the fuel just before ignition takes place.

The mixture stratification thus produced by direct fuel injection must be stabilized by the main flow structures in the cylinder space of the internal combustion engine and by the geometry of the combustion chamber, in order to outlast the time-span between the end of injection and the beginning of ignition, even in the presence of the typically high turbulence levels of the internal flow. Main flow forms in this context are swirl and tumble movements. In the instance of a swirl movement the cylinder charge rotates about the cylinder axis due to the specific design of the intake passage, whereas a tumble flow is characterized by the charge rotating about an axis parallel to the crankshaft.

An intake-generated tumble vortex exhibits accelerated rotation due to the reduced cross-sectional area during compression. On the other hand the tumble flow is somewhat less stable than a swirl flow rotating about the cylinder axis, with a tendency to separate into more complex secondary vortices. In the final phase of compression strong disintegration of the tumble vortex into smaller, stochastically distributed vortices is observed if the valve angle (of a typical four-valve combustion chamber) is sufficiently flat. A tumble flow may be generated in the cylinder space of a modern, multivalve, spark-ignition engine with two or three intake valves without risking significant reductions in the flow coefficients of the intake ports. As a consequence, tumble flows are frequently used flow designs for spark-ignition engines in which the combustion characteristics are to be improved by means of increased charge movement.

For the delivery of fuel into the combustion chamber under the above flow conditions an injection valve is presented in SAE Paper 940188, which produces a cone-shaped injection jet with excellent fuel atomization. By changing the fuel pressure and the counterpressure in the combustion chamber the angle of the injected spraycone may be influenced. A typical property of such injection nozzles is the improvement of atomization quality with rising injection pressure. This desired dependency will lead to increasing velocities of the injection jet of up to 100 m/s, however, accompanied by a high momentum of the fuel spray entering the combustion chamber. By contrast, the air flow in the combustion chamber, even in the presence of strong intake generated swirl or tumble movements, exhibits a far smaller momentum (not more than 30–40 m/s), such that the injection jet in a first phase of entering the combustion chamber is only slightly influenced by the flow movements prevailing therein.

In view of the above considerations the main task to be accomplished is to transform the injection jet into a locally concentrated fuel-air spraycloud, which must be advanced from the nozzle of the injection valve to the spark plug, and to further mix the mixture inside this cloud with the air in the combustion chamber. In this context the following points are essential:

The fuel-air spray must maintain its compact shape, especially at low engine loads, and should possibly be kept in the center of the combustion chamber, for thermodynamical reasons and in order to reduce the emissions of unburned hydrocarbons.

Evaporation of the injected fuel and its mixing with the air in the combustion chamber to a preferably stoichiometric air ratio must be effected in the comparatively short time span between injection period and ignition point.

At the spark plug there should prevail a low mean flow velocity, together with a high turbulence level, to promote ignition of the fuel-air spray by the spark.

In developing a suitable combustion process for a spark-ignition engine with direct fuel injection, the particular dimensions of the combustion chamber must be taken into account as well as the characteristics of injection jet propagation. In an automobile engine of the spark-ignition type typical volumes of the individual cylinders lead to bore diameters of 60–100 mm, the piston lift approximately being in the same order of magnitude.

In view of the above propagation velocities of the injection jet at least part of the fuel spray is expected to hit the surface of the piston. For this reason the design of the flow movements inside the combustion chamber should take into account this process of wetting the walls.

In shaping the spraycloud and preparing the fuel-air mixture the following effects may be utilized:

Deflection of the high momentum of the injection jet towards the spark plug by means of the piston surface;

High injection pressure to improve atomization, thus accelerating direct evaporation of the fuel spray before it reaches the wall;

Generation of a higher turbulence level in the area of the injection jet by means of the flow movements inside the combustion chamber;

Acceleration of wall film evaporation by generating a high flow velocity in the wetted area of the piston surface.

EP 0 558 072 A1 is concerned with an engine design in which the intake ports are shaped and arranged such that a reverse tumble movement of the flow inside the combustion chamber is generated. This movement is amplified by a ramp-shaped configuration of the piston surface. The piston surface also serves to deflect the injection jet towards the spark plug which is located in the cylinder center. In this way the injection jet and the flow in the combustion chamber pass along the piston surface in the same direction. The injection jet, or rather, the fuel-air spray into which the jet is transformed after its deflection at the piston, is permitted to propagate in all directions almost unimpeded, however, after having reached the cylinder head wall in the vicinity of the spark plug. No efforts are made at compacting the spraycloud after its deflection at the piston. Furthermore, the ramp-shaped projection on the piston surface produces a compression face underneath the exhaust valves. As a consequence, an additional, desirable, flow movement is created during engine compression just before the upper dead center, which is reversed, however, on the return move, thus tearing apart the compact mixture built up during the compression stroke.

Another variant of an internal combustion engine with direct fuel injection in presented in EP 0 694 682 A1, in which the intake ports are shaped such that a swirl flow is generated in the cylinder space. The piston surface has a clearly defined recess surrounded by a compression face, the recess being positioned eccentrically such that the spark plug in the center of the combustion chamber and the radially positioned injection valve are located at the edge of the recess. Fuel injection is directed towards the edge of the recess which is specifically designed for this purpose. In this instance the surface of the piston is primarily employed for diversion of the fuel jet. The task of the swirl flow is to advance the fuel diverted from the edge of the recess towards the spark plug.

If we assume that the principal unit of a spark-ignition engine with direct fuel injection is an aggregate with two or more intake valves per combustion chamber for optimum cylinder charging, one main problem in designing the combustion process is presented by the arrangement of the components, since both spark plug and injection nozzle must be accommodated in the cylinder head, the two having about the same dimensions.

To ensure reliable ignition and stable combustion the injection nozzle is frequently placed in close vicinity of the spark plug in previous arrangements. Placing the injection nozzle next to the spark plug will inevitably reduce valve diameters, however, thus leading to undesirable performance losses. If the optimized valve diameters realized in multivalve spark-ignition engines are to be maintained, the only suitable location for the injection nozzle will be near the cylinder wall.

Positioning the injection nozzle at a comparatively large distance from the spark plug which is preferably placed in the center of the combustion chamber, will put high demands on the combustion process. The fuel jet must travel a greater distance from the nozzle to the ignition location, which is accompanied by a greater time lapse between injection and ignition. In view of the generally high turbulence level in the combustion chamber the two factors will render it more difficult to maintain a compact fuel-air spraycloud with small cyclical fluctuations, which is indispensable for attaining a stable and accurately replicable combustion process in each engine cycle.

Repetitive accuracy of the spatial propagation process may be significantly improved if the flow movement inside the cylinder has an ordered structure of high stability throughout the compression phase.

SUMMARY OF THE INVENTION

It is an object of this invention to provide a combustion process which takes the above conditions into account and is based on the principal assumption of an intake-generated tumble flow in the cylinder space of the internal combustion engine. Above all, the invention is to ensure operational stability over a wide range of operating conditions.

In the invention this object is achieved by proposing that the top surface of the piston facing the combustion chamber be provided with a substantially Y-shaped configuration of flow guiding ribs, of which an arc-shaped rib is positioned approximately in the center of the piston and encloses a trough-shaped recess, and that a longitudinal rib be provided on the side of the arc-shaped rib opposite of the recess, and, further, that the ignition source be positioned above the recess, and that the fuel injection device be positioned in the area of the cylinder wall between the intake valves.

An essential feature of this arrangement is the flow transformation occurring during compression, when the tumble vortex is transformed into two vortices rotating in opposite directions, whose rotational axes align themselves more and more in parallel with the cylinder axis during the compression phase, i.e., a "tipover" of the tumble vortex rotating in parallel with the crankshaft axis into a flow form which is also referred to as ω-tumble.

Configuring the top surface of the piston in accordance with the invention will serve the following purposes:

Assisting in the formation of a basic tumble flow during the intake period and transformation into the typical ωmovement.

Efficient transformation of the main flow into increased turbulence during the late compression phase.

Deflection of the injection jet towards the spark plug.

Guiding of the fuel-air stream to minimize cyclical fluctuations in mixture distribution.

In a multivalve variant of the internal combustion engine with two or three intake valves the intake ports leading towards the intake valves are configured such that they will generate a tumble flow in the cylinder space during the intake phase. In order to obtain good performance at full load the ignition source is positioned near the cylinder center, between intake and exhaust valves. The injection nozzle has a lateral position near the edge of the cylinder, between two intake valves; in an engine with two intake valves the injection nozzle preferably is placed in the symmetry plane of the cylinder which is situated at a right angle relative to the crankshaft, in a position inclined relative to the cylinder axis.

On the side facing the injector the top surface of the piston proposed by the invention assumes a concavely curved shape, the curvature of the surface increasing in radial direction towards the piston center and being upwardly directed towards the roof of the combustion chamber. This part of the surface may be situated in parts slightly below the reference plane through the piston rim, which plane forms the peripheral area of the piston's top surface. In a view from above and seen in the direction of the cylinder, the upper edge of this concave part of the surface assumes the shape of an arc, which is open towards the intake side and reaches its greatest height above the reference plane through the piston rim in the region of the symmetry plane. This concave part of the surface, which is configured as a troughshaped recess, serves for the purpose of deflecting the injection jet from the direction of injection, which is inclined relative to the cylinder axis, towards the spark plug. Precise alignment between the upper edge of the recess and the position of the spark plug is of special importance. The outer side of the arc-shaped edge is joined by another concavely curved surface, which merges into the reference plane tangentially. In the area of the symmetry plane this outer surface exhibits a projecting rib with a ridge extending from the arc-shaped edge towards the piston rim, where it also meets the reference plane tangentially. This rib is designed to convert the tumble vortex formed during the intake phase into an ω-tumble flow of two vortices rotating in opposite directions, in parallel with the cylinder axis, which towards the end of the compression stroke will increase flow velocity near the piston's top surface deflecting the injection jet.

To attain optimum flow guidance it will be of advantage if the arc-shaped rib is approximately semicircular as seen from above, the radius of the arc being 0.3 to 0.7 times, preferably 0.4 to 0.6 times, that of the piston radius.

It is a special advantage if the upper edge of the arc-shaped rib is either sharp or rounded with a radius of not more than 3 mm, whose ends tangentially merge into the top surface of the piston, the point of tangency preferably lying below the valve disks of intake valves. In a configuration with two intake valves each tangential point is below one of the intake valves, in a variant with three intake valves these points are below the outer intake valves.

A particularly stable flow may be obtained by positioning the longitudinal rib adjacent to the arc-shaped rib essentially in the plane going through the axis of the ignition source and through the axis of the fuel injection device.

In a variant of the invention the longitudinal rib departs from the central section of the arc-shaped rib and exhibits a slightly rounded upper edge, whose end merges into the top surface of the piston, the point of tangency preferably lying between the valve disks of the exhaust valves in a view from above.

In another variant the longitudinal rib departs from the central section of the arc-shaped rib and exhibits a slightly rounded ridge area whose width decreases towards the cylinder wall and whose end merges into the top surface of the piston, transition preferably occurring between the valve disks of the exhaust valves in a view from above.

BRIEF DESCRIPTION OF THE DRAWINGS

The invention will be further described with reference to the accompanying drawings, in which.

Parts of the same functions have the same reference numbers in all variants.

DESCRIPTION OF PREFERRED EMBODIMENTS

Figure 1:
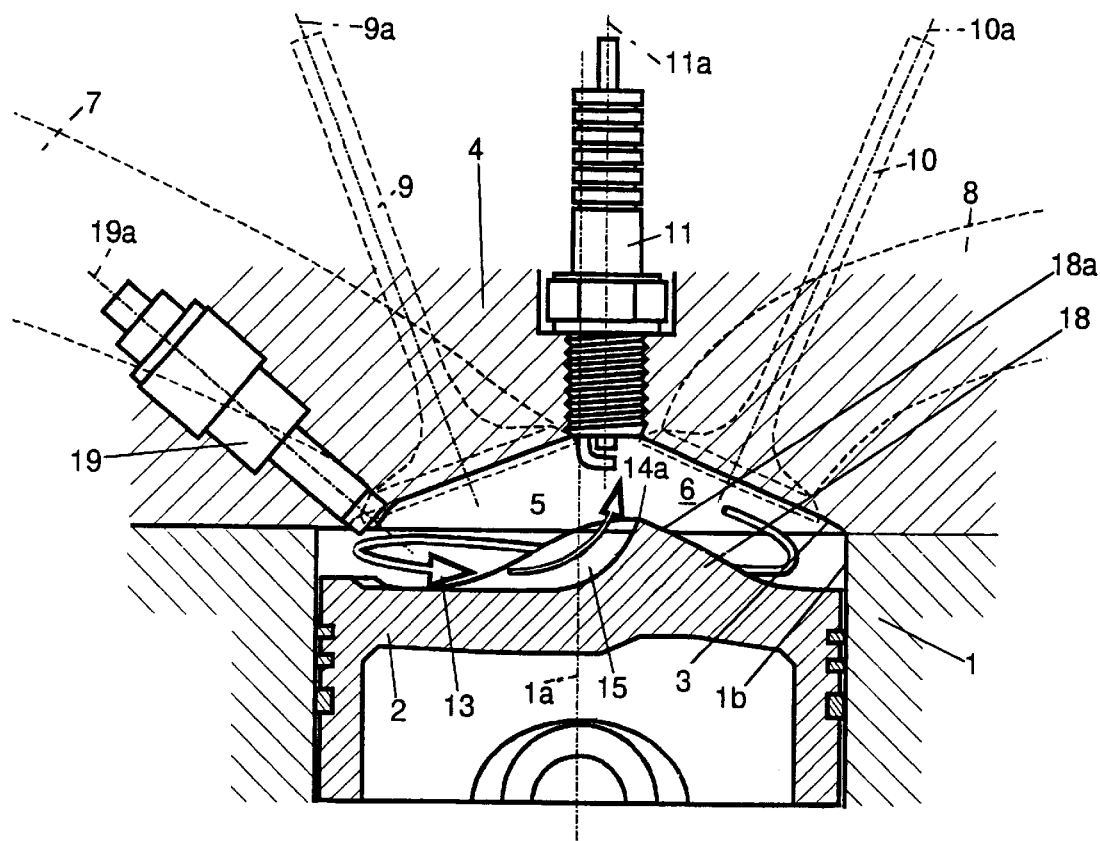
FIG. 1 is a cross-section through a cylinder of a four-stroke internal combustion engine in accordance with the invention, along a line I-I in FIG. 2.

In a cylinder 1 of an internal combustion engine a reciprocating piston 2 is positioned so as to slide in longitudinal direction. The cylinder wall is referred to as 1b. The roof-shaped top 3 of the combustion chamber in the cylinder head 4 und the top surface 5 of piston 2 form a combustion chamber 6 into which open two intake ports 7 and two exhaust ports 8, for example, which are indicated by dashed lines in FIG. 1. Corresponding intake and exhaust valves, which are in inclined position and are indicated by dash-dotted lines, bear the reference numbers 9 and 10. The valve axes are referred to as 9a and 10a, respectively. 11 refers to a centrally positioned spark plug with an axis 11a. Between the intake ports 7 an injection nozzle 19 is located for direct fuel injection into the combustion chamber 6. The axis 19a of the injection nozzle 19 is positioned in a plane vertical to the crankshaft axis (not shown here) and forms an angle of 30° to 60° with the cylinder axis 1a, i.e., preferably about 45°.

On its top surface 5 the piston 2 is provided with a Y-shaped configuration of guiding ribs 12, which influence the flow inside the cylinder (arrows 13) to optimize the combustion process.

As is shown in the Figures, the guiding rib configuration 12 exhibits an arc-shaped rib 14 which is essentially configured as a semicircle. The upper edge 14a of rib 14 is either sharp or rounded with a radius of not more than 3 mm. In the central section lying between the cylinder axis 1a and the exhaust valves 10, the upper edge 14a of rib 14 reaches its greatest height. It continuously decreases in height towards the intake valves 9 and merges into the piston top surface 5 below the intake valves 9. The rib 14 encloses a trough-shaped recess 15.

The central section of the arc-shaped rib 14 is joined by a longitudinal rib 18, which extends between the exhaust valves 10 towards the rim of the piston 2. The section of the arc-shaped rib 14 from where the longitudinal rib 18 departs, is further removed in the same direction from the cylinder axis 1a than the axis 11a of the spark plug 11 positioned in the roof-shaped top 3 of the combustion chamber 6.

Below the spark plug 11 the rib 14 forms a first concave area; further concave areas are formed below the two exhaust valves 10.

Figure 3:
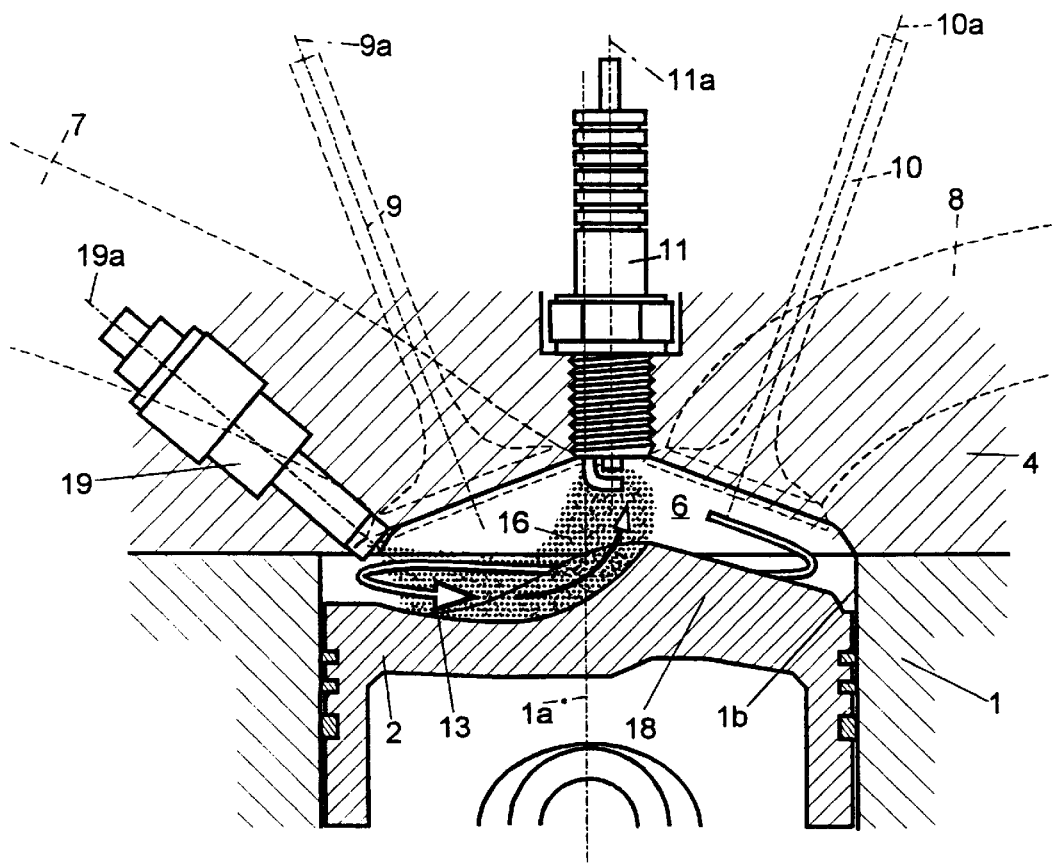
FIG. 3 is a cross-section through a cylinder of another variant of the invention, along line III-III in FIG. 4.
Figure 4:
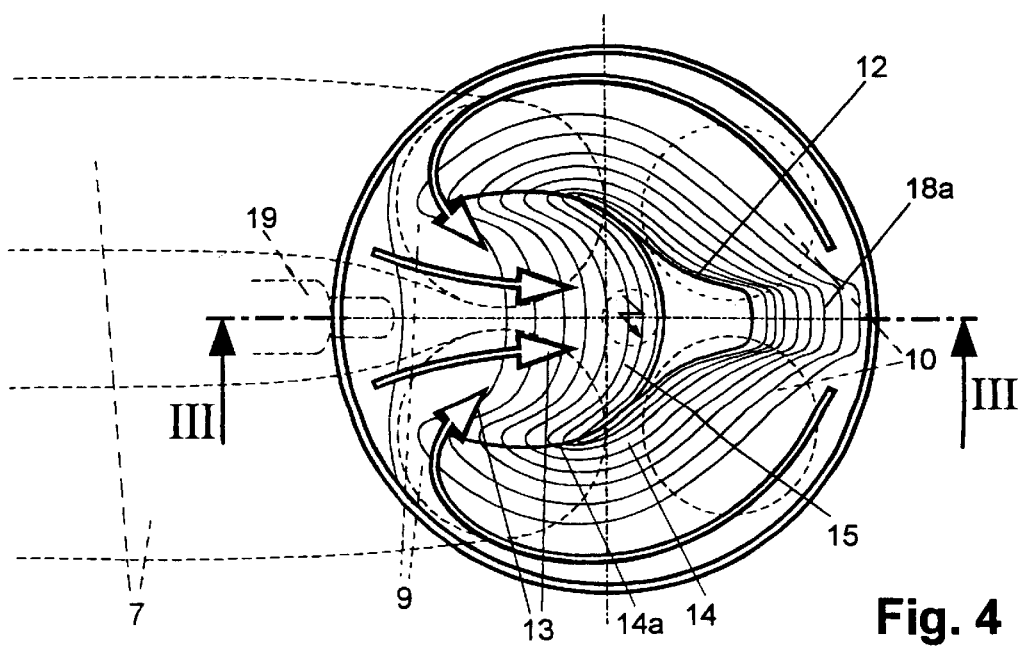
FIGS. 4, 5, 6 show further variants, the view corresponding to that of FIG. 2.

The variant of FIGS. 3 and 4 differs from the variant described above in that the longitudinal rib 18 has a flat ridge face 18a. The arc-shaped rib 14 encloses a trough-shaped recess 15, which has a certain depth and may extend below the reference plane through the piston rim.

Figure 5:
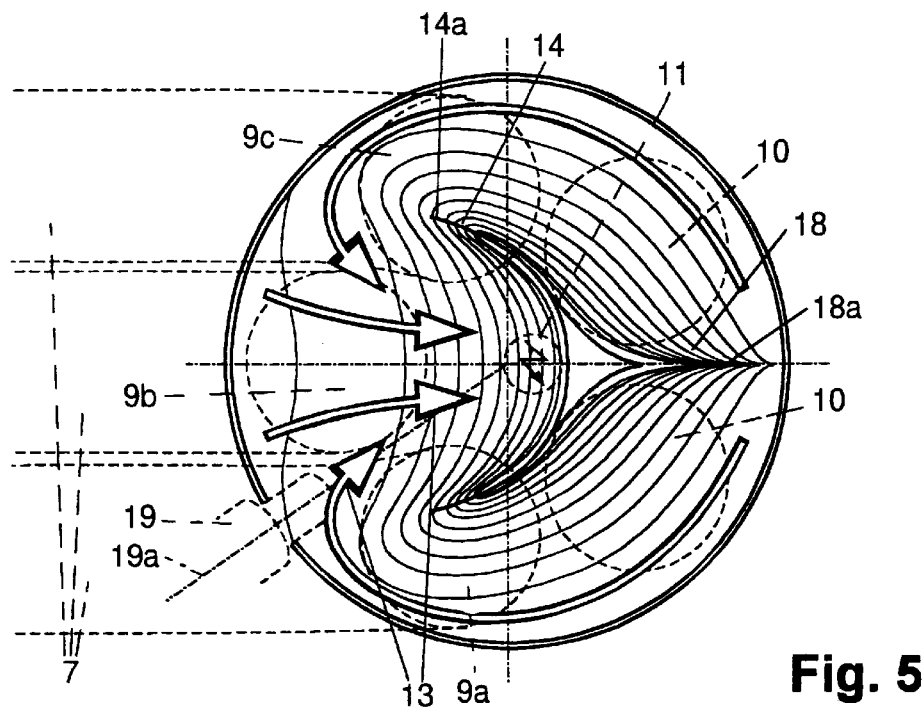

FIG. 5 presents a variant of the invention with three intake valves 9a, 9b, 9c. The injection nozzle 19 is positioned between valves 9a and 9b. The rib 14 continuously decreases in height towards intake valves 9a and 9c and below them joins the piston top surface 5 tangentially. For better illustration please note the fuel-air spraycloud 16 in FIG. 3, which is deflected towards the spark plug 11 due to the flow inside the cylinder and the shape of the piston 2.

Figure 2:
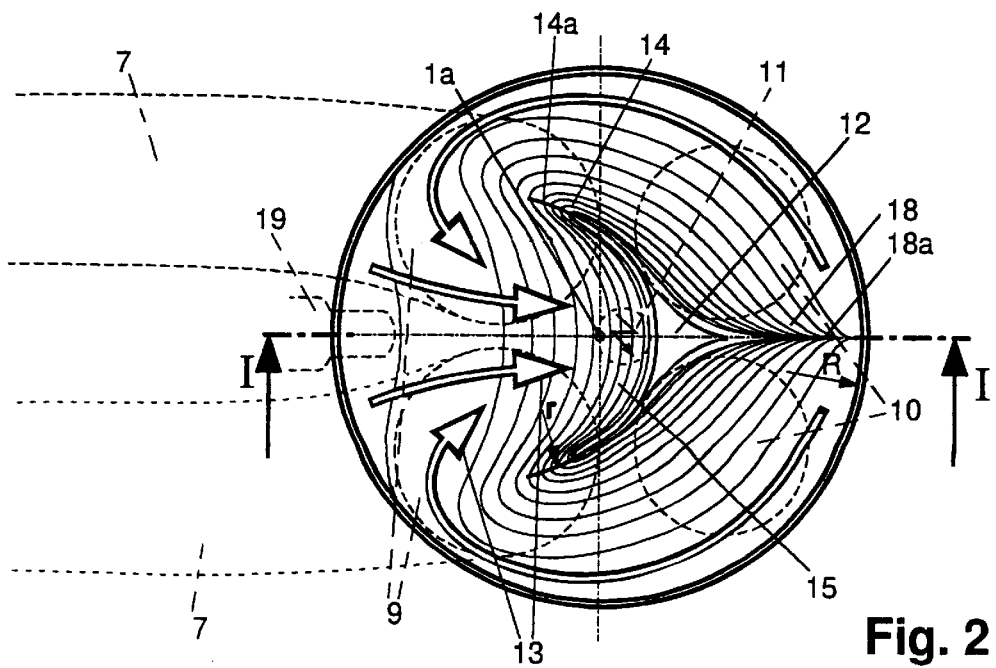
FIG. 2 is a view from above of a piston in accordance with FIG. 1.
Figure 6:
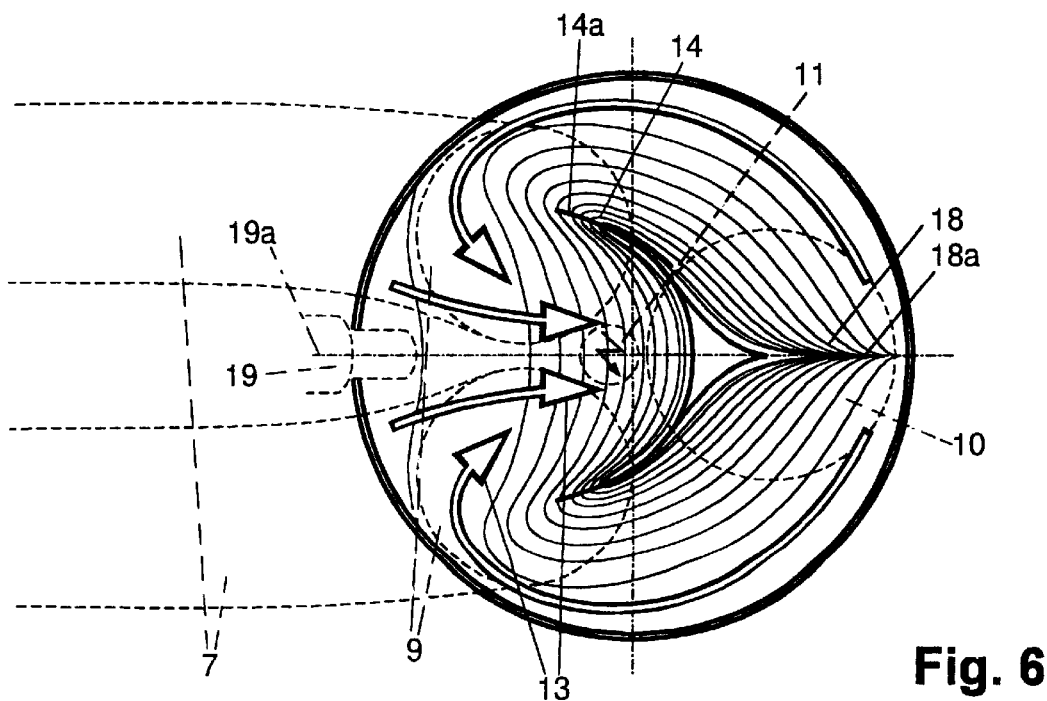

FIG. 6 shows a variant with two intake valves 9 and an exhaust valve 10. The configuration of the piston is more or less the same as that of the variant shown in FIGS. 1 and 2.

The present invention will ensure stable combustion even under very lean operating conditions.

We claim:

1. A four-stroke internal combustion engine with spark ignition and direct fuel injection into the combustion chamber, with a reciprocating piston for each cylinder, and a roof-shaped combustion chamber top with at least one exhaust valve and at least two intake valves, as well as intake ports generating a tumble flow in the combustion chamber, as well as a fuel injection device opening into the combustion chamber, and an ignition source located in the area of the cylinder axis in the combustion chamber roof, wherein the piston is provided on its top surface facing the combustion chamber with a substantially Y-shaped configuration of flow guiding ribs, of which an arc-shaped rib is positioned approximately in the center of the piston and encloses a trough-shaped recess, and a longitudinal rib is provided on the side of the arc-shaped rib opposite of the recess, and wherein the ignition source is positioned above the recess, and the fuel injection device is positioned in the area of the cylinder wall between the intake valves.

2. A four-stroke internal combustion engine as claimed in claim 1, wherein the arc-shaped rib is approximately semi-circular in a view from above, the radius of the rib being 0.3 to 0.7 times that of the piston radius.

3. A four internal combustion engine as claimed in claim 2, wherein the arc-shaped rib exhibits an upper edge, which is either sharp or rounded with a radius of not more than 3 mm and whose ends tangentially merge into the top surface of the piston, the point of tangency lying below the valve disks of intake valves.

4. A four-stroke internal combustion engine as claimed in claim 2, wherein the longitudinal rib departs from the central section of the arc-shaped rib and exhibits a slightly rounded upper edge, whose end merges into the top surface of the piston, the point of tangency lying between the valve disks of exhaust valves in a view from above.

5. A four-stroke internal combustion engine as claimed in claim 2, wherein the longitudinal rib departs from the central section of the arc-shaped rib and exhibits a slightly rounded ridge area whose width decreases towards the cylinder wall and whose end merges into the top surface of the piston, transition occurring between the valve disks of exhaust valves in a view from above.

6. A four-stroke internal combustion engine as claimed in claim 2, wherein the top surface of the piston exhibits three concave areas, one of which is enclosed by the arc-shaped rib and the other two are formed on the sides of the longitudinal rib.

7. A four-stroke internal combustion engine as claimed in claim 1, wherein the arc-shaped rib is approximately semi-circular in a view from above, the radius of the rib being 0.4 to 0.6 times that of the piston radius.

8. A four-stroke internal combustion engine as claimed in claim 7, wherein the arc-shaped rib exhibits an upper edge, which is either sharp or rounded with a radius of not more than 3 mm and whose ends tangentially merge into the top surface of the piston, the point of tangency lying below the valve disks of intake valves.

9. A four-stroke internal combustion engine as claimed in claim 7, wherein the longitudinal rib departs from the central section of the arc-shaped rib and exhibits a slightly rounded upper edge, whose end merges into the top surface of the piston, the point of tangency lying between the valve disks of exhaust valves in a view from above.

10. A four-stroke internal combustion engine as claimed in claim 7, wherein the longitudinal rib departs from the central section of the arc-shaped rib and exhibits a slightly rounded ridge area whose width decreases towards the cylinder wall and whose end merges into the top surface of the piston, transition occurring between the valve disks of exhaust valves in a view from above.

11. A four-stroke internal combustion engine as claimed in claim 7, wherein the top surface of the piston exhibits three concave areas, one of which is enclosed by the arc-shaped rib and the other two are formed on the sides of the longitudinal rib.

12. A four-stroke internal combustion engine as claimed in claim 1, wherein the arc-shaped rib exhibits an upper edge, which is either sharp or rounded with a radius of not more than 3 mm and whose ends tangentially merge into the top surface of the piston, the point of tangency lying below the valve disks of intake valves.

13. A four-stroke internal combustion engine as claimed in claim 1, wherein the longitudinal rib is positioned essentially in the plane going through the axis of the ignition source and through the axis of the fuel injection device.

14. A four-stroke internal combustion engine as claimed in claim 1, wherein the longitudinal rib departs from the central section of the arc-shaped rib and exhibits a slightly rounded upper edge, whose end merges into the top surface of the piston, the point of tangency lying between the valve disks of exhaust valves in a view from above.

15. A four-stroke internal combustion engine as claimed in claim 1, wherein the longitudinal rib departs from the central section of the arc-shaped rib and exhibits a slightly rounded ridge area whose width decreases towards the cylinder wall and whose end merges into the top surface of the piston, transition occurring between the valve disks of exhaust valves in a view from above.

16. A four-stroke internal combustion engine as claimed in claim 1, wherein the axis of the fuel injection device forms an angle of 30° to 60° with the cylinder axis.

17. A four-stroke internal combustion engine as claimed in claim 1, wherein the top surface of the piston exhibits three concave areas, one of which is enclosed by the arc-shaped rib and the other two are formed on the sides of the longitudinal rib.

18. A four-stroke internal combustion engine as claimed in claim 17, wherein the concave areas are situated, at least in parts, below the reference plane through the piston rim.

19. A four-stroke internal combustion engine as claimed in claim 1, wherein the axes of the intake valves and the axes of the exhaust valves are inclined relative to each other.

20. A four-stroke internal combustion engine as claimed in claim 1, wherein the section of the arc-shaped rib from where the longitudinal rib departs, is further distant in the same direction from the cylinder axis than the axis of the spark plug positioned in the roof-shaped top of the combustion chamber.

* * * * *